(12) United States Patent
Hsu et al.

(10) Patent No.: US 6,650,356 B2
(45) Date of Patent: Nov. 18, 2003

(54) DIGITAL CAMERA DIY WIRELESS PHOTO PRINT DEVICE

(75) Inventors: Jui-Ming Hsu, Hsinchu (TW); Li-Kuang Chen, Taipei (TW); Tah-Yeong Lin, Taoyuan Hsien (TW); Chiou-Liang Wang, Chungli (TW)

(73) Assignee: Chung-Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 10/025,427

(22) Filed: Dec. 19, 2001

(65) Prior Publication Data
US 2003/0112324 A1 Jun. 19, 2003

(51) Int. Cl.[7] .................................................. H04N 7/14
(52) U.S. Cl. ................ 348/14.01; 348/14.02; 348/14.05; 348/281.9
(58) Field of Search ................ 348/14.01, 14.05, 348/14.02, 231.9, 77, 383, 586, 373; 358/18; 379/93.12

(56) References Cited

FOREIGN PATENT DOCUMENTS

| JP | 410173833 A | * | 6/1998 | ............ H04N/1/00 |
| JP | 2001-325658 | * | 11/2001 | ............ G07F/17/00 |
| JP | 2001339625 A | * | 12/2001 | ............ H04N/5/22 |
| TW | 432817 A | * | 5/2001 | ............ H04B/10/00 |
| TW | 463071 A | * | 11/2001 | ............ G04B/17/40 |

* cited by examiner

*Primary Examiner*—Melur Ramakrishnaiah
(74) *Attorney, Agent, or Firm*—J. C. Patents

(57) ABSTRACT

The present invention provides a digital camera DIY wireless photo print device. The device comprises a billing box, a wireless image-receiving unit, a processor, a monitor, and a photo printer. Wherein, the processor includes a plurality of control and IrDA protocol-processing programs to control the other units that are connected to the processor. The billing box provides a variety of payment methods. The monitor displays the two-way communication between the device and the user, and also displays the status of the image file transmission. The wireless image-receiving unit receives the optic signal of the image file, processes the photo-electronic transformation, and outputs an image file data to the processor. The processor controls the photo printer to print and output the photo.

11 Claims, 2 Drawing Sheets

DIGITAL CAMERA DIY WIRELESS PHOTO PRINT DEVICE

BACKGROUND OF THE INVENTION

1. Field of Invention

The present invention generally relates to a digital camera wireless photo print device, and more particularly, relates to a digital camera do-it-yourself (DIY) wireless photo print device that can be allocated in a convenience spot of the public area to provide the convenient digital camera photo print service to the users.

2. Description of Related Art

Since the techniques of the digital camera have been significantly improved in the recent years, not only the price of the digital camera reduced significantly, but also the resolution enhances continuously. In addition, the functions of the storage, transmission and editing are also improved significantly. Thus, the digital camera has a great advantage compared to the conventional camera that is not able to achieve those new functions. Along with the favorable factors, such as better performance, more reasonable price and the more and more add-ons functions, the digital camera is accepted by the public broadly, and thus becomes a popular product now.

The photo taken by the digital camera is stored in digital camera's memory unit such as the memory card in digital format. Each photo has an image file corresponding to it. The image file is generally such as an image file in the JPEG compression format. The digital image file must be printed out to have a real paper photo. In order to have the same quality as the conventional photo printer, the photo printer is used by user to print out the image file.

The digital camera allows users to print out the photo by themselves, and more particularly, to allow users to print out the photo via the wireless manner. Referring to FIG. 1, FIG. 1 schematically shows an individual infrared wireless photo print system. The digital camera 100 transmits the image file that is taken by the digital camera 100 to a wireless photo-printing adaptor 102 via the infrared according to an infrared transmission protocol. The wireless photo-printing adaptor 102 transforms the image file format and outputs the transformed image data to an ink jet printer 104 to print out the photo.

The individual wireless photo print system mentioned above comprises a plurality of equipments, normally, the equipments are allocated in a fix location such as in home. The photo taken by the user in outside must be brought back to home to print out the photo. Therefore, the individual wireless photo print system mentioned above is limited by the time and the location. Whereas, the photo print is generally operated via the processor, the user has to know how to operate the processor to process the photo print. Furthermore, since the equipments of the photo print system are rather expensive, even the digital camera becomes more popular now, the high cost of the photo print equipments and the operation is not convenient to use are annoyances of the users and also become a problem that must be resolved by the vendors.

SUMMARY OF THE INVENTION

To solve the problem mentioned above, the present invention provides a digital camera DIY wireless photo print device. The device can be allocated in any convenience spot that is needed. The user is able to print out the photo taken by the digital camera in real time by paying a service charge and without the limitation of the operation.

The present invention provides a digital camera DIY wireless photo print device. The device comprises a billing box, a wireless image-receiving unit, a processor, a monitor, and a photo printer. Wherein, the processor includes a plurality of control and IrDA protocol-processing programs to control the other units that are connected to the processor. The billing box provides a variety of payment methods. The monitor displays the two-way communication between the device and the user, and also displays the status of the image file transmission. The wireless image-receiving unit receives the optic signal of the image file, processes the photo-electronic transformation, and outputs an image file data to the processor. The processor controls the photo printer to print and output the photo.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings, FIG. 1 schematically shows an individual infrared wireless photo print system.

DESCRIPTION OF THE PREFERRED EMBODIMENTS

One of the major characteristics of the present invention is a digital camera DIY wireless photo print device. The device comprises a full set of the wireless photo print system. The device can be allocated in any convenience spot that is needed. The user is able to print out the photo taken by the digital camera in real time by paying a service charge and without the limitation of the operation.

Generally, the photo print method of the digital camera includes wire print, card-insertion print, and the wireless print. Wherein, the wireless print is the most convenient transmission method. The digital camera that adopts the wireless print, for example, uses the infrared as the medium to transmit the digital photo data now. A plurality of communication protocols such as the Infrared Transfer Picture (IrTran-P) protocol and the Jet-send Protocol can be applied in the wireless transmission method. Wherein, the IrTran-P protocol is further configured above the Infrared Data Association (IrDA) protocol.

Generally, the wireless photo print system dedicated to the individual or home must be equipped with all the equipments personally, and is generally allocated in a fix location. When the user is going outside, for example, like on traveling or on the business trip, it is not possible to carry the whole set of the equipments. The present invention thus provides a digital camera DIY wireless photo print device. The device can be allocated in the public area, like the sightseeing area, supermarkets, super vendor stores, department stores, to provide the convenient photo print service, and thus the convenience is efficiently enhanced.

It is not adequate to use the wire connection in the public area, it is because the photo print device usage is quite heavy, thus makes the connectors and the wires subject to be easily damaged and broken. In addition, the signal connector specification of each vendor's digital camera is not the same, if the signal is transmitted via the connection wire, the customers have to prepare the connection wire by themselves, thus creates the unnecessary inconvenience. The method of wireless print can be accomplished by pressing a button remotely as long as within the safe distance to print out the photo. Thus, the wireless print is much convenient and also prevents the equipments from damage that caused by the incorrect usage.

Figure 1:
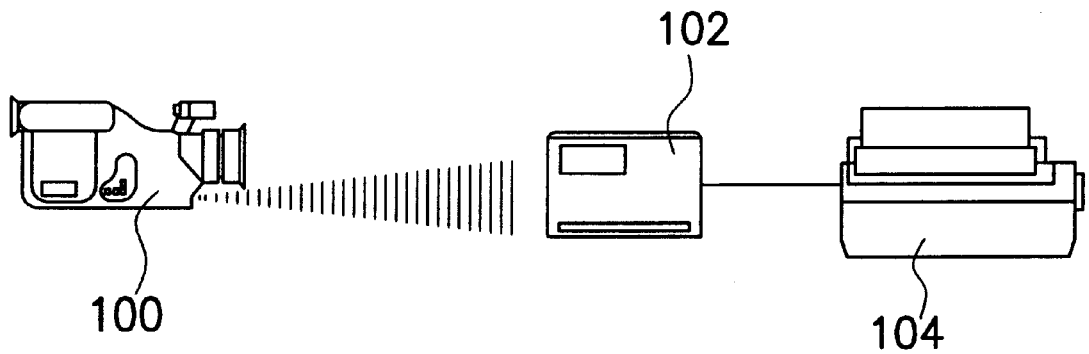
Figure 2:
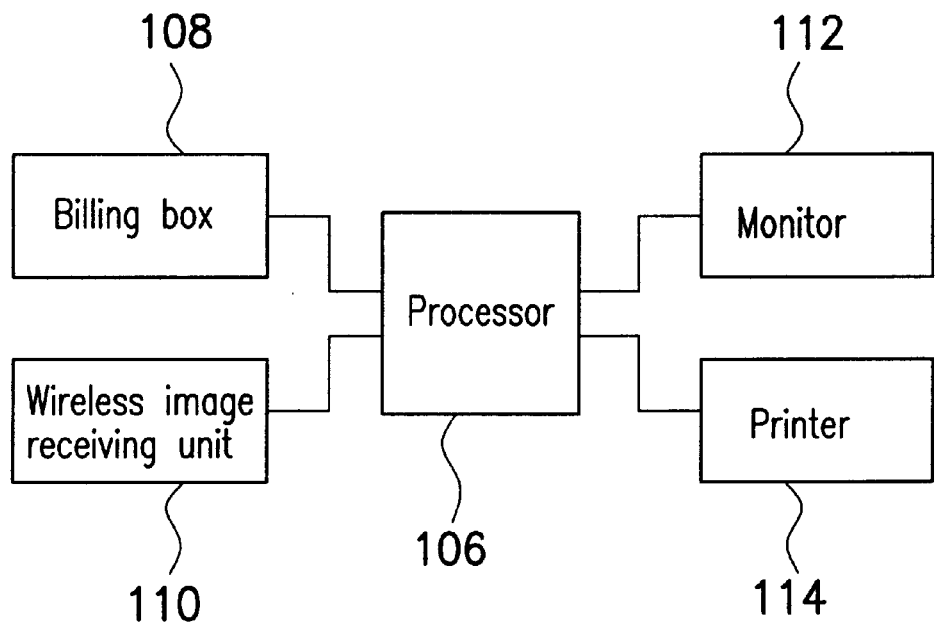
FIG. 2 schematically shows a block diagram of an infrared DIY photo print system according to the present invention.

An embodiment is exemplified below to describe the characteristics of the present invention. Referring to FIG. 2, FIG. 2 schematically shows a block diagram of an infrared DIY photo print system according to the present invention.

The present invention comprises a processor 106, a billing box 108, a wireless image-receiving unit 110, a monitor 112, and a photo printer 114. Wherein, the processor includes a plurality of control and IrDA protocol-processing programs to control the other units that are connected to the processor mentioned above. The billing box 108 is connected to the processor 106, provides a variety of the payment methods such as the coin-insertion or pay by credit card. After the user pays the charge via the billing box 108, the processor 106 displays some information such as some options on the monitor 112. Through the cooperation of the billing box 108, the processor 106 and the monitor 112, the user is able to have two-way communication with the photo print device. The monitor 112 is also able to display all the status of the operation and the status of the image file transmission.

The wireless image-receiving unit 110, receives the optic signal of the image file sent from the digital camera, the transmission is according to the selected transmission protocol. The wireless image receiving unit 110, after receiving the infrared signal, processes the photo-electronic transformation to transform the image file data into the image format that can be accepted by a general processor, such as the common used JPEG compression format. The image file data is subsequently sent to the processor 106. The processor 106 further controls the photo printer 114 to print and output the photo. Generally, the photo printer accepts the BMP format, thus, the JPEG is first decompressed into the BMP format, and then is printed via the halftone print technology cooperating with the printer control language.

Figure 3:
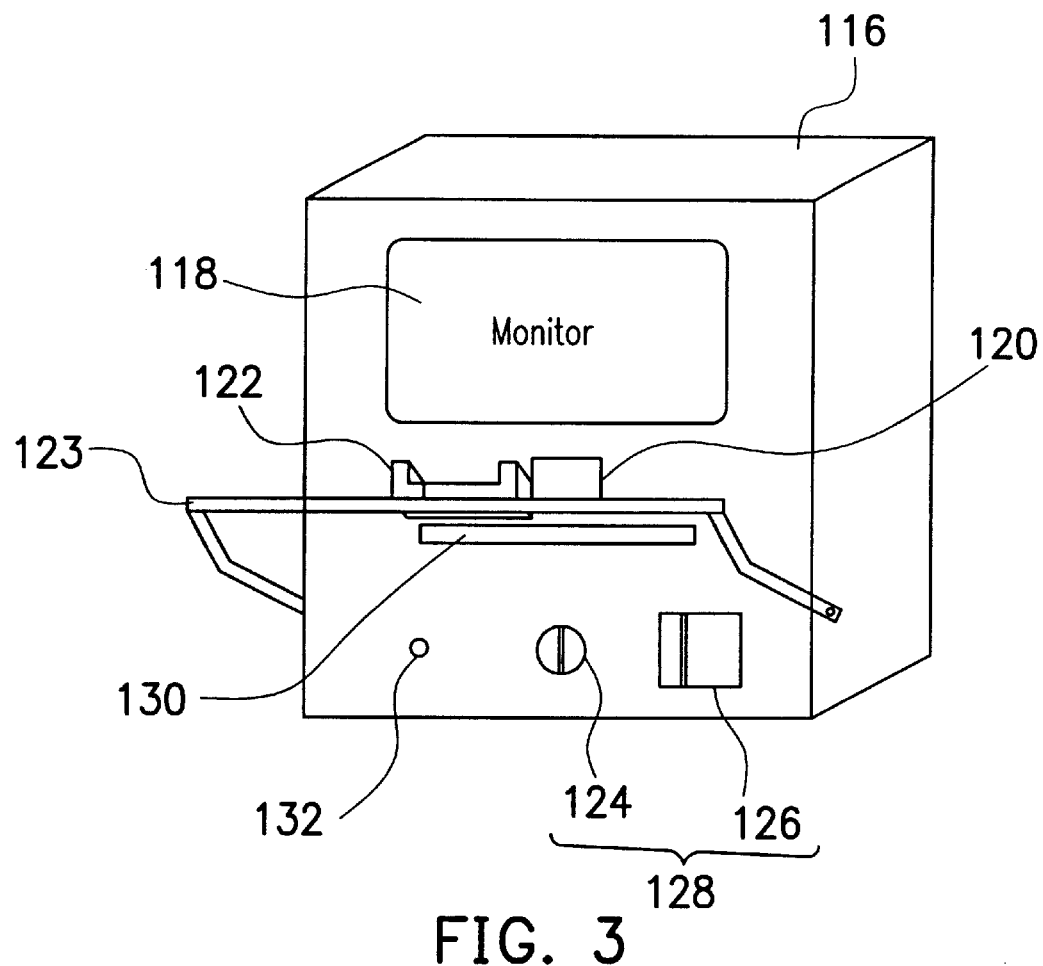
FIG. 3 schematically shows a three-dimensional structure diagram of an infrared DIY photo print device according to the present invention.
Figure 4:
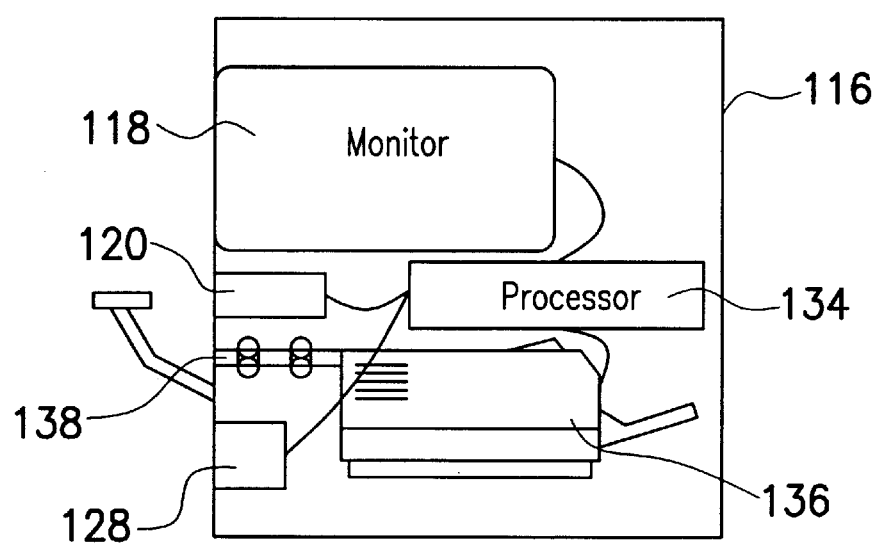
FIG. 4 schematically shows a cutaway view diagram of the infrared DIY photo print device of FIG. 3 according to the present invention.

According to the wireless photo print system mentioned above, the system can be assembled as an independent device. FIG. 3 schematically shows a three-dimensional structure diagram of an infrared DIY photo print device according to the present invention. FIG. 4 schematically shows a cutaway view diagram of the infrared DIY photo print device of FIG. 3 according to the present invention. In FIG. 3 and FIG. 4, a case 116 is used to assemble and lay up the photo print system within it. A processor 134 is allocated inside the case 116. A program is used to control the connected peripheral devices including the monitor 118, the photo printer 136, the wireless image-receiving unit 120, and the billing box 128. The case 116 has a screen window for monitor 118 to display information. The case 116, for example, also equips a stand 123 and a camera holder 122 that is located on the stand 123. The camera holder 122 allows the digital camera place into it to aim to the wireless image-receiving unit 120. There is also an infrared window in case 116 to correspond to the wireless image receiving unit 120 to receive the infrared signal. In addition, corresponding to the billing box 128, the case 116 also equips a coin-insertion hole 124 and the pay by credit card member 126, or the member for the other payment method such as the other smart IC card or the prepaid card. The printer 136, for example, can be an ink jet printer. Besides, in order to protect the photo that is just printing out, a photo paper output guidance member 138, for example, including the roller and the paper guidance slot are also included. The cast 116 also equips a photo paper outlet 130 that is corresponding to the photo paper output guidance member 138.

In addition, the processor cooperates with the billing box ensures the user had paid successfully. Then the processor controls the device into a standby mode.

The wireless photo print device according to the present invention has the fullest function of the photo print. Thus, the device can be allocated in the convenient public area for user to print out the photo in real time. The user is able to print out the photo without having the processor professional knowledge.

The wireless photo print device according to the present invention has the payment function that is convenient for user to use the system by paying the charge.

The wireless photo print device according to the present invention utilizes the wireless transmission method, thus, is not limited to the output connector specifications of different vendors.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A digital camera DIY wireless photo print device, the device can be allocated in an adequate location, and suitable for a user to print an image file of a digital camera, the device comprises:

a processor, having a system program, to control a plurality of peripheral units that are connected to the processor or listed below, the peripheral units comprises:

a billing box, provides a plurality of payment methods;

a wireless image-receiving unit, receives a signal of the image file that is sent from the digital camera, processes a transformation, and outputs an image file data to the processor;

a monitor, displays the two-way service communication between the processor and the user, and also displays a status of the image file process; and a photo printer, the photo is controlled by the processor and used for printing the image file, wherein the device is used by the user to print the image file of the digital camera of the user.

2. The digital camera DIY wireless photo print device of claim 1, further comprises a case, the case comprises:

an infrared window;

a camera holder, allows the digital camera place into the camera holder, aims to the infrared window, outputs the optic signal of the image file to the wireless image-receiving unit;

a coin-insertion hole, provides one of the payment methods;

a pay by credit card member, provides one of the payment methods; and a power display.

3. The digital camera DIY wireless photo print device of claim 1, wherein the signal sent from the digital camera comprises an infrared using IrDA and IrTran-P protocol modes to output.

4. The digital camera DIY wireless photo print device of claim 3, wherein the wireless image-receiving unit transforms the data into a processor image file format by using the IrDA and IrTran-P protocols.

5. The digital camera DIY wireless photo print device of claim 1, further comprises a photo paper output guidance member to output a photo that is print out.

6. The digital camera DIY wireless photo print device of claim 5, wherein the photo paper output guidance member comprises a paper guidance slot and a roller member to protect the photo.

7. The digital camera DIY wireless photo print device of claim 1, wherein the processor cooperates with the billing box ensures the user had paid successfully.

8. The digital camera DIY wireless photo print device of claim 1, wherein the system program of the processor comprises controlling the device into a standby mode.

9. The digital camera DIY wireless photo print device of claim 1, wherein the system program of the processor comprises controlling the device into a hibernation mode.

10. The digital camera DIY wireless photo print device of claim 1, wherein the system program of the processor comprises a communication protocol.

11. The digital camera DIY wireless photo print device of claim 1, wherein the adequate location where the wireless photo print device is allocated comprises a public area.

* * * * *